(12) United States Patent
Soechtig et al.

(10) Patent No.: US 10,663,981 B2
(45) Date of Patent: May 26, 2020

(54) FLOW CONTROL VALVE

(71) Applicant: NEOPERL GmbH, Klosterrunsstraße, Müllheim (DE)

(72) Inventors: Michael Soechtig, Neuenburg (DE); Klaus Witte, Sieversdorf (DE)

(73) Assignee: NEOPERL GMBH, Muellheim (DE)

( * ) Notice: Subject to any disclaimer, the term of this patent is extended or adjusted under 35 U.S.C. 154(b) by 5 days.

(21) Appl. No.: 15/307,530

(22) PCT Filed: Apr. 30, 2015

(86) PCT No.: PCT/EP2015/000890
§ 371 (c)(1),
(2) Date: Oct. 28, 2016

(87) PCT Pub. No.: WO2015/165590
PCT Pub. Date: Nov. 5, 2015

(65) Prior Publication Data
US 2017/0052544 A1 Feb. 23, 2017

(30) Foreign Application Priority Data
Apr. 30, 2014 (DE) .................... 20 2014 003 567 U

(51) Int. Cl.
*G05D 7/01* (2006.01)

(52) U.S. Cl.
CPC ....... *G05D 7/0113* (2013.01); *Y10T 137/7879* (2015.04)

(58) Field of Classification Search
CPC .................... G05D 7/0113; Y10T 137/7879
See application file for complete search history.

(56) References Cited

U.S. PATENT DOCUMENTS

| 3,886,968 | A |   | 6/1975 | Murrell |
| 4,646,700 | A | * | 3/1987 | Tuckey ................ F02M 69/54 123/510 |
| 5,348,231 | A |   | 9/1994 | Arnold et al. |
| 5,988,211 | A |   | 11/1999 | Cornell |
| 6,263,871 | B1 | * | 7/2001 | Brown ..................... A62B 9/06 128/200.29 |

(Continued)

FOREIGN PATENT DOCUMENTS

| DE | 20 2004 008 281 U1 | 10/2005 |
| DE | 20 2012 010 798 U1 | 2/2014 |

(Continued)

OTHER PUBLICATIONS

International Search Report of International Application No. PCT/EP2015/000890, dated Jul. 3, 2015, 4 pages.

(Continued)

*Primary Examiner* — Jessica Cahill
*Assistant Examiner* — Patrick C Williams
(74) *Attorney, Agent, or Firm* — Fay Sharpe LLP

(57) ABSTRACT

A flow control valve includes a membrane which has at least one opening for the flow of a fluid and an annular body which has a flow contact surface and at least one flow opening. The flow opening is in flow connection with the at least one opening in the membrane. The membrane is constructed to be bendable in a direction towards the flow contact surface.

30 Claims, 13 Drawing Sheets

(56) References Cited

U.S. PATENT DOCUMENTS

| | | | | |
|---|---|---|---|---|
| 6,899,207 | B2* | 5/2005 | Deferme | F16F 9/348 |
| | | | | 188/282.5 |
| 6,902,123 | B2* | 6/2005 | Grether | E03C 1/084 |
| | | | | 239/428.5 |
| 2010/0102145 | A1* | 4/2010 | Staedtler | E03C 1/08 |
| | | | | 239/428.5 |
| 2010/0282869 | A1 | 11/2010 | Grether | |

FOREIGN PATENT DOCUMENTS

| | | |
|---|---|---|
| FR | 1 010 381 A | 6/1952 |
| FR | 2 948 133 A1 | 1/2011 |
| WO | WO 2004/085753 A1 | 10/2004 |

OTHER PUBLICATIONS

English Translation of International Preliminary Report on Patentability of International Application No. PCT/EP2015/000890, dated Nov. 1, 2016, 8 pages.

\* cited by examiner

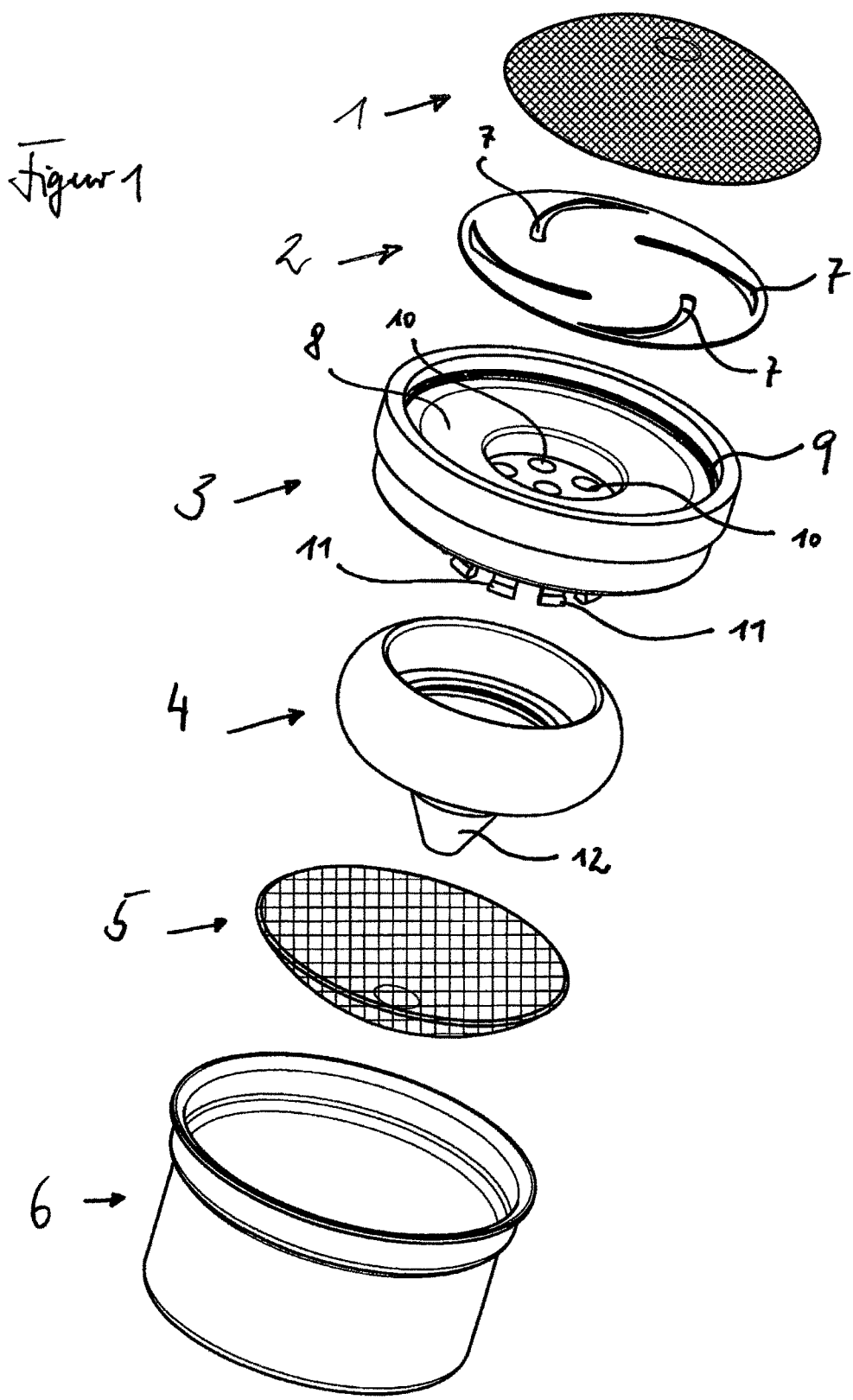

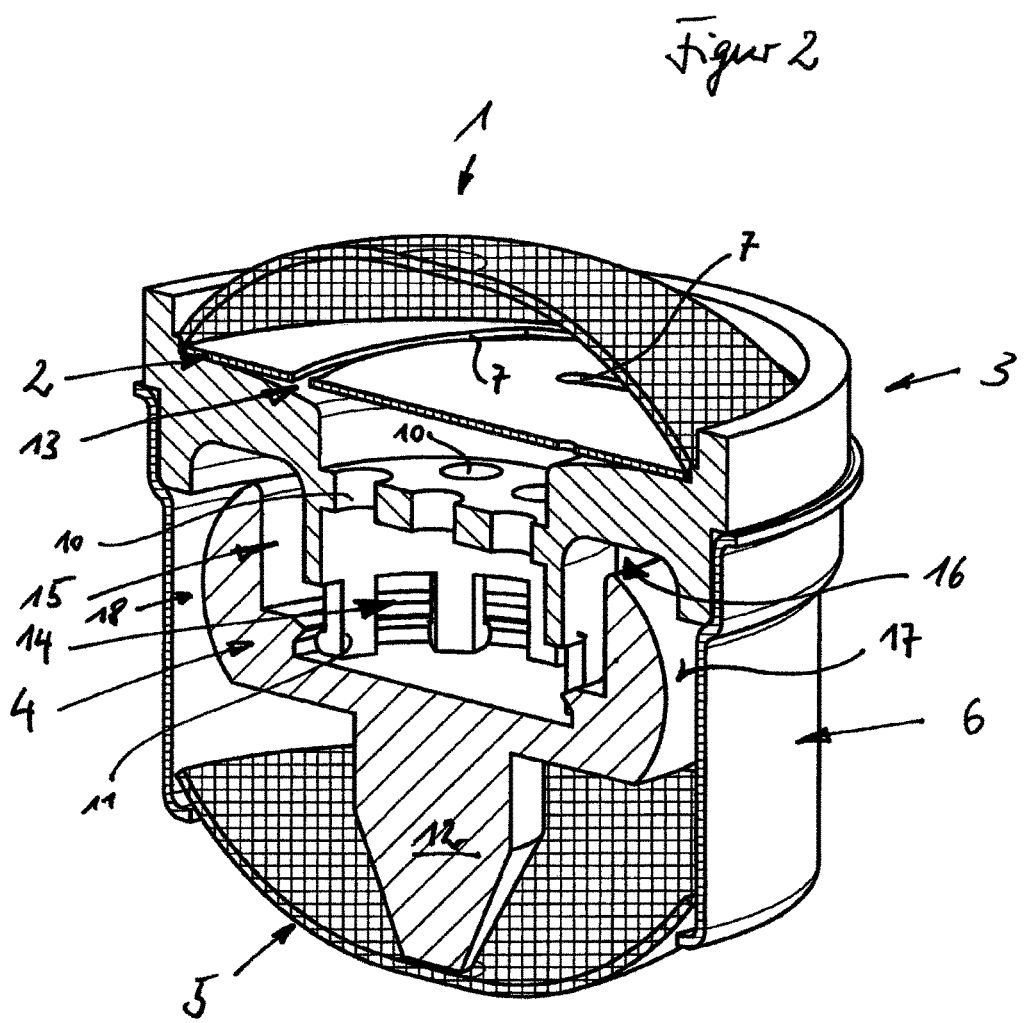

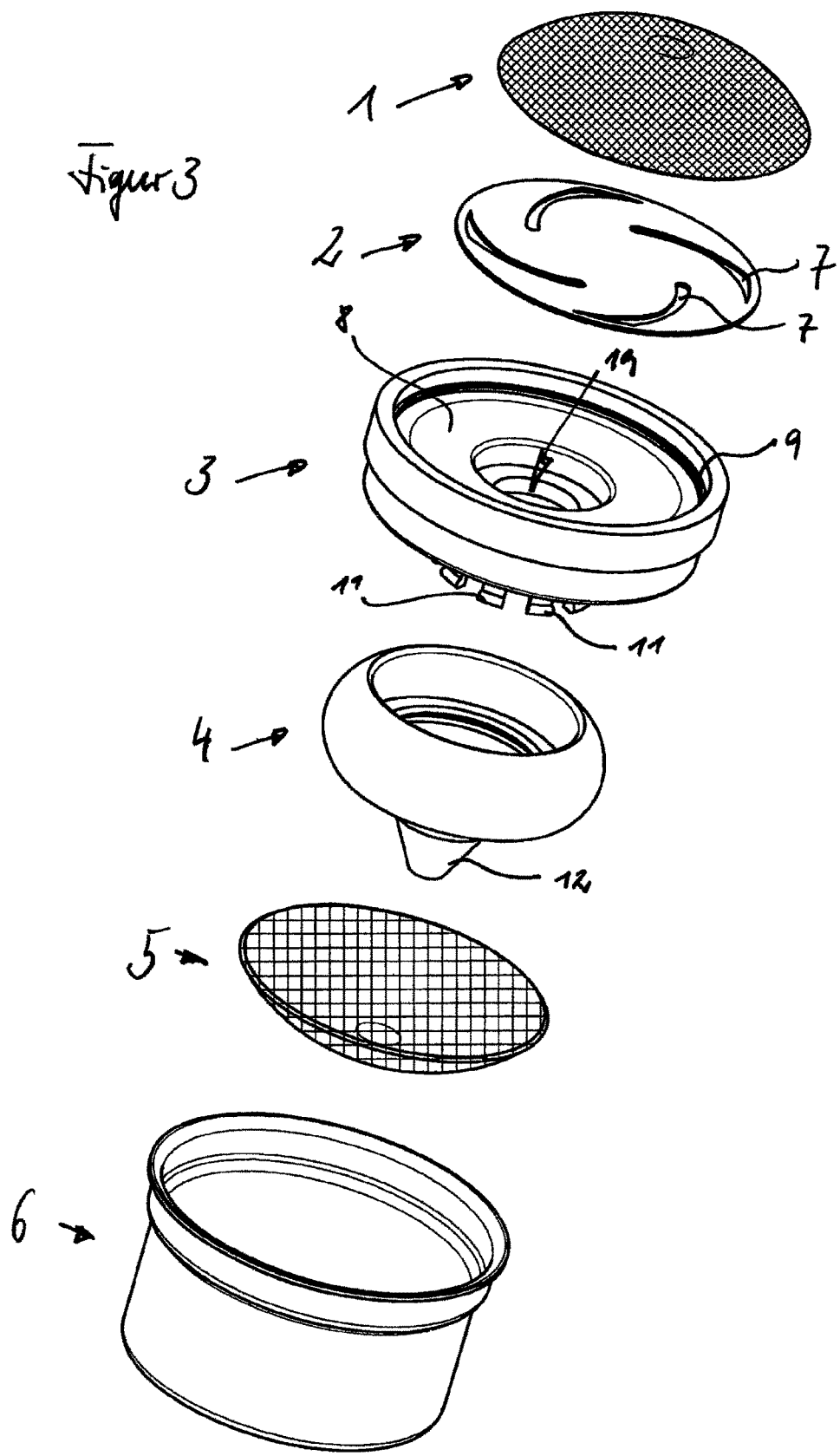

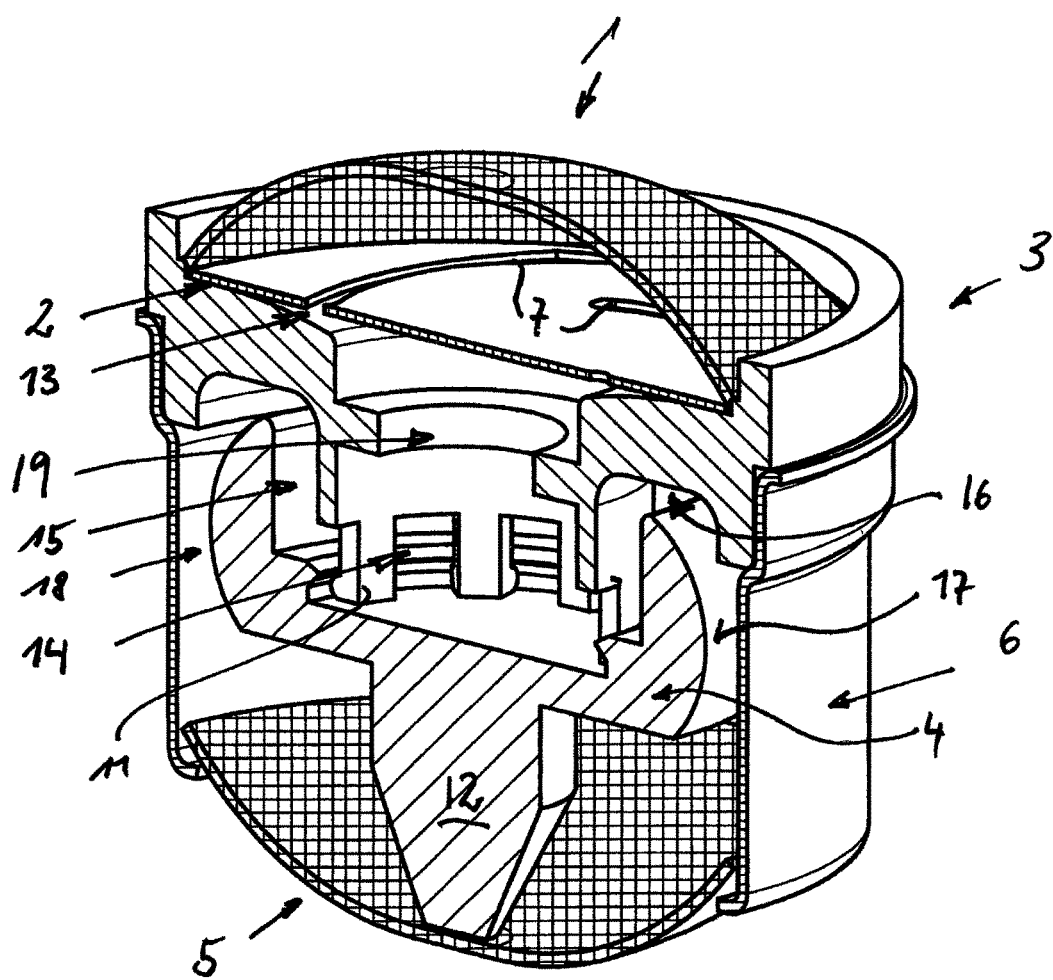

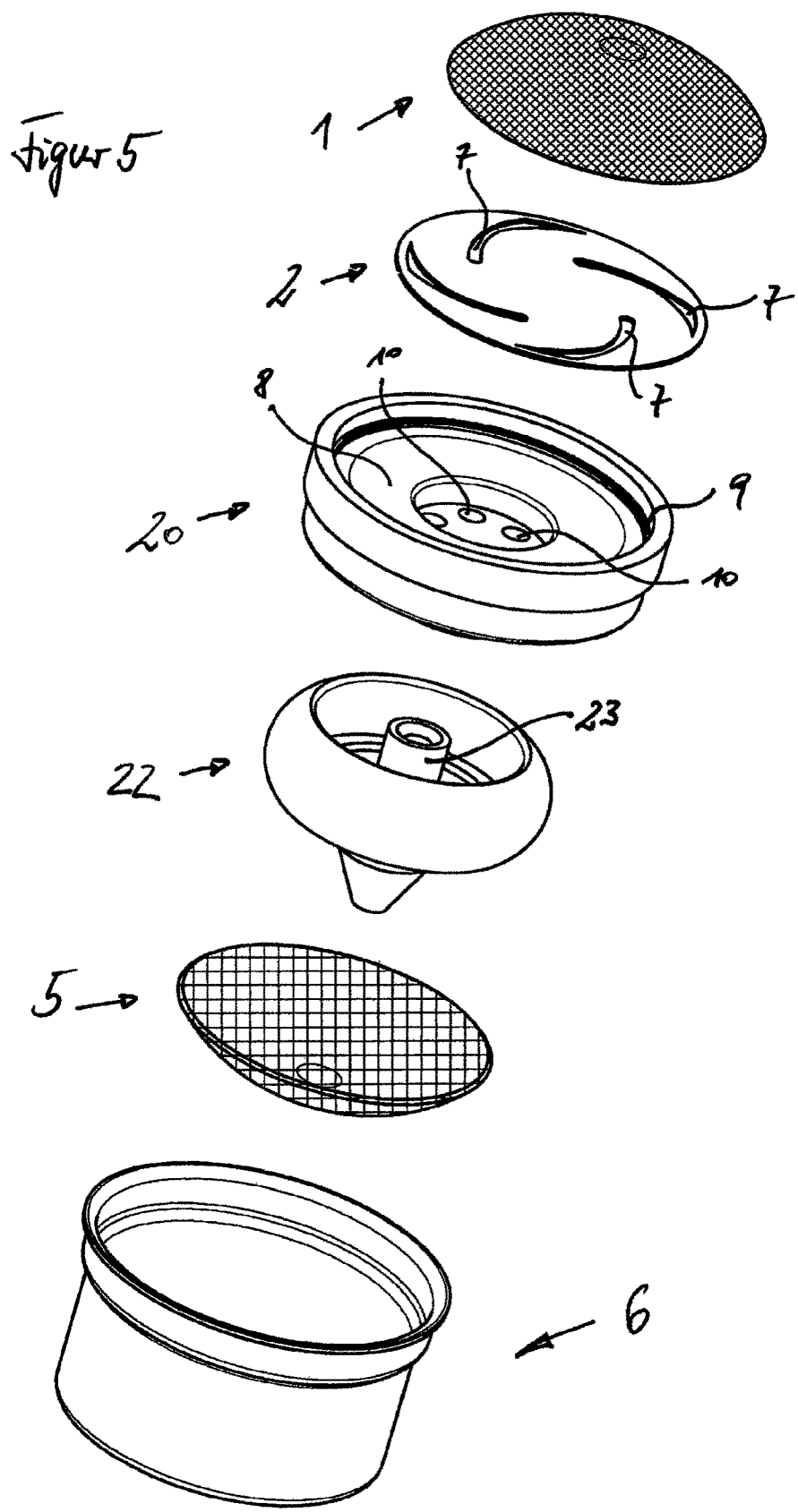

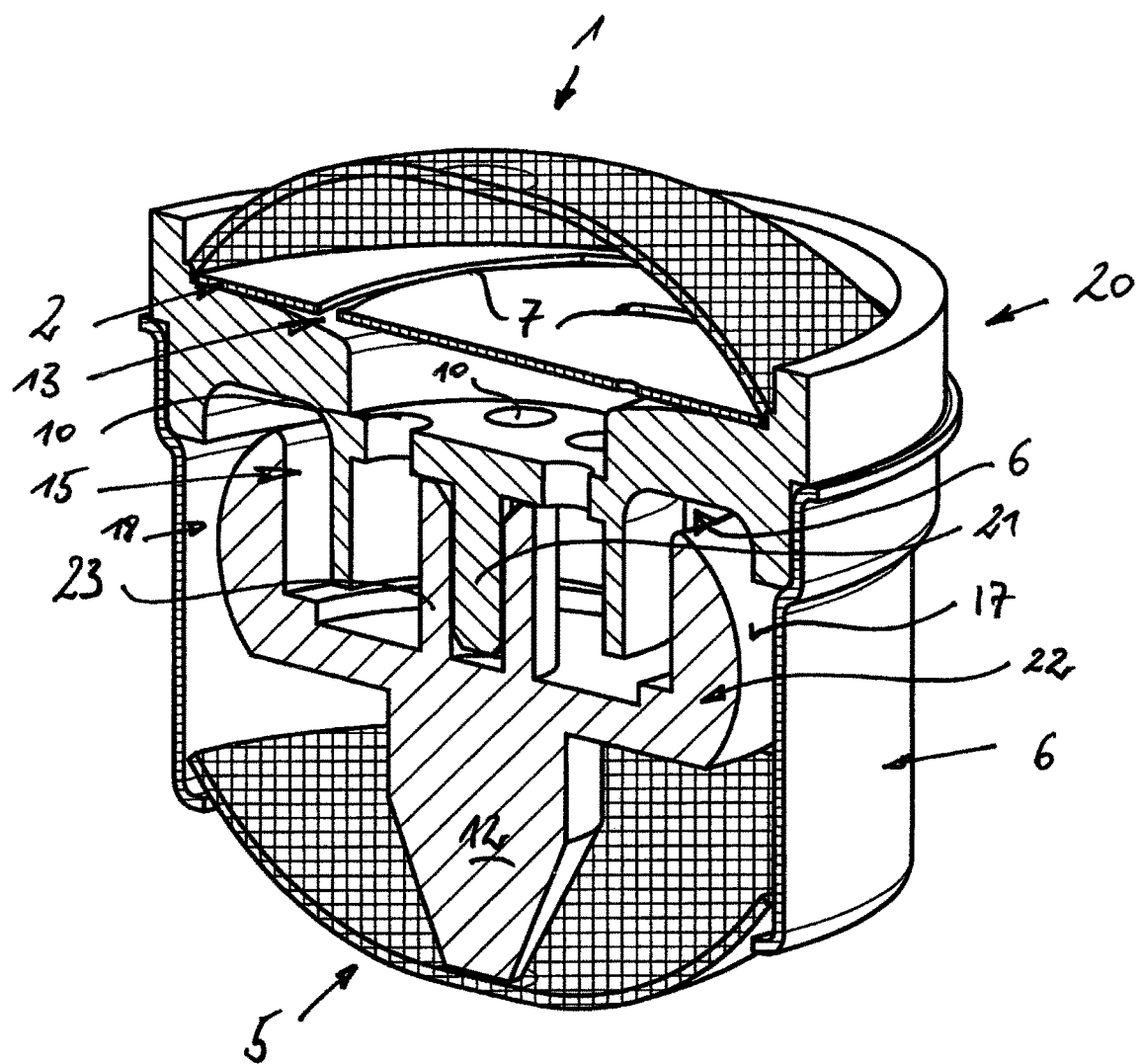

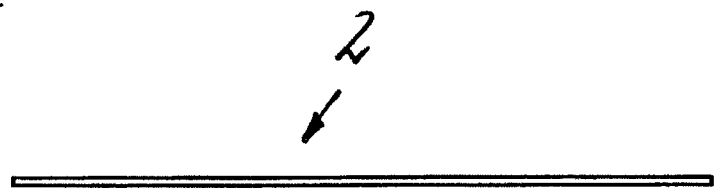
Figur 7
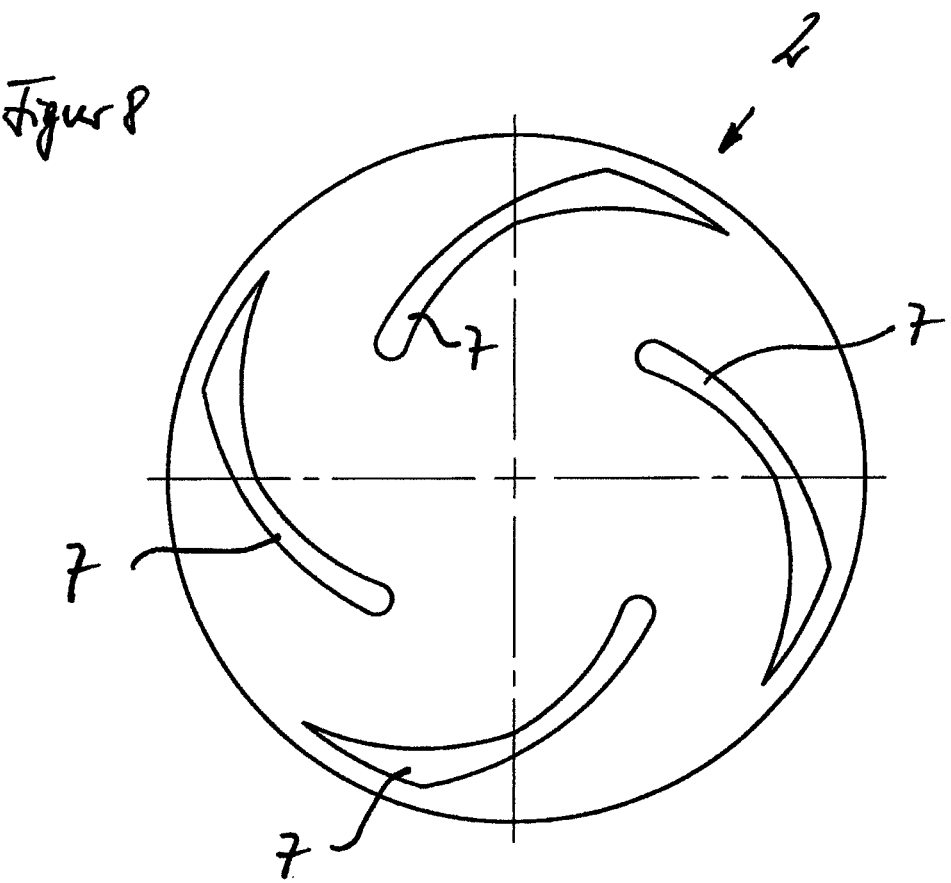
Figur 8

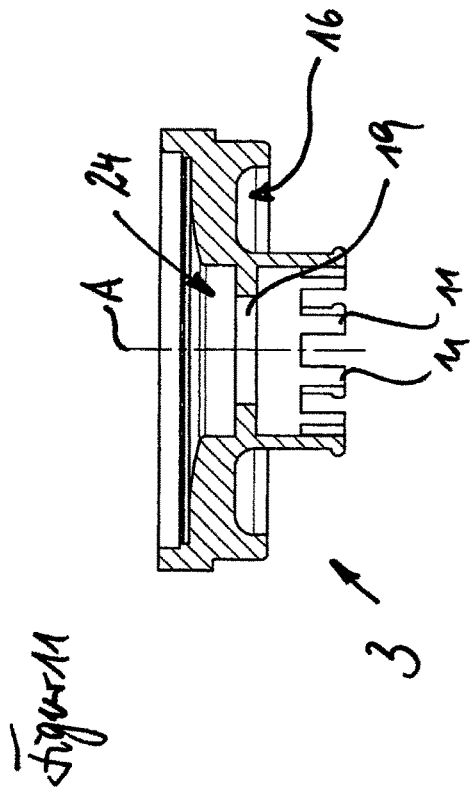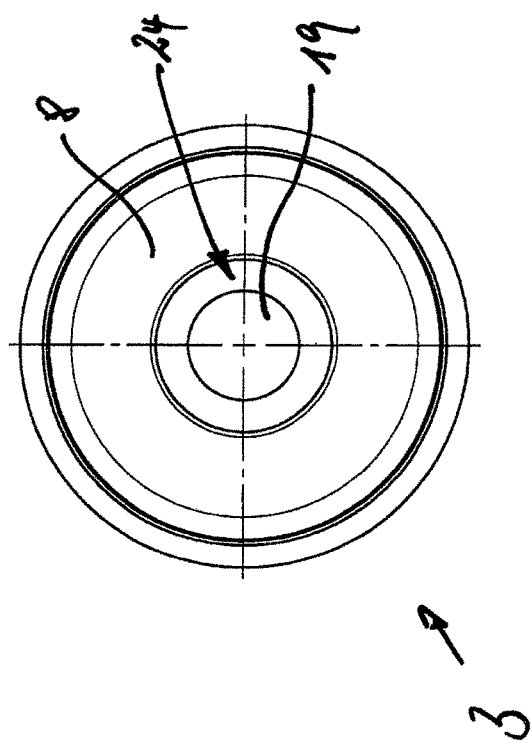

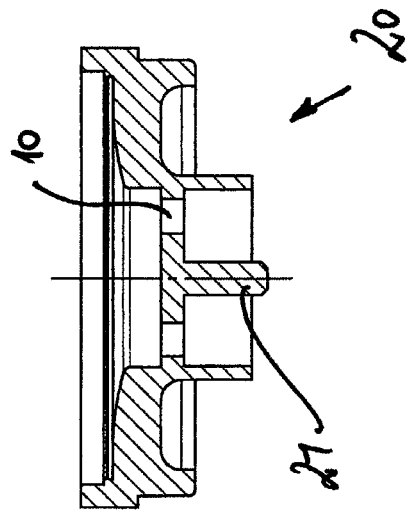
Figur 13
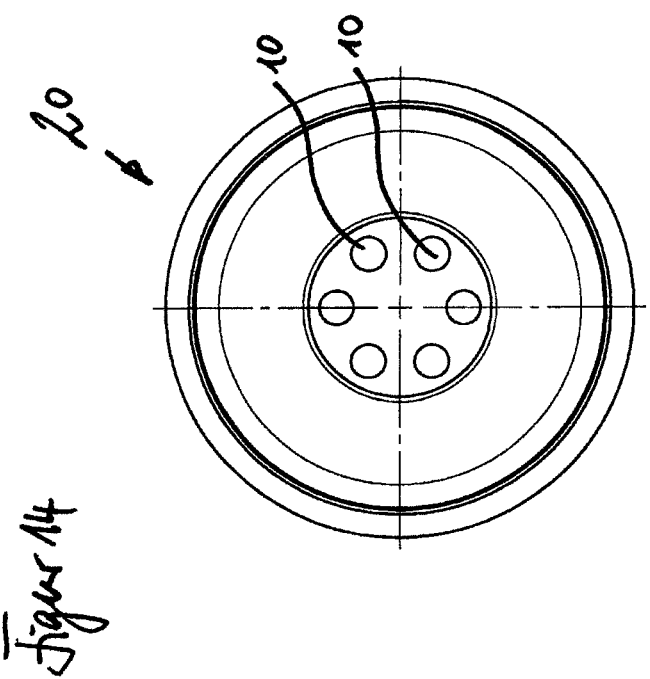
Figur 14

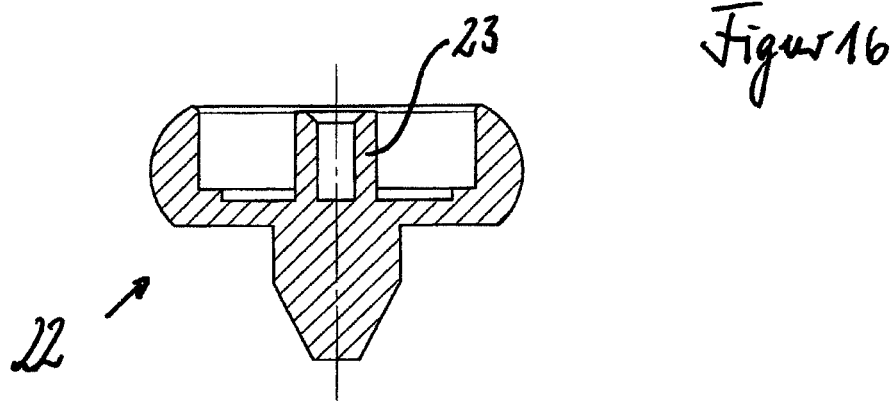
Figur 16
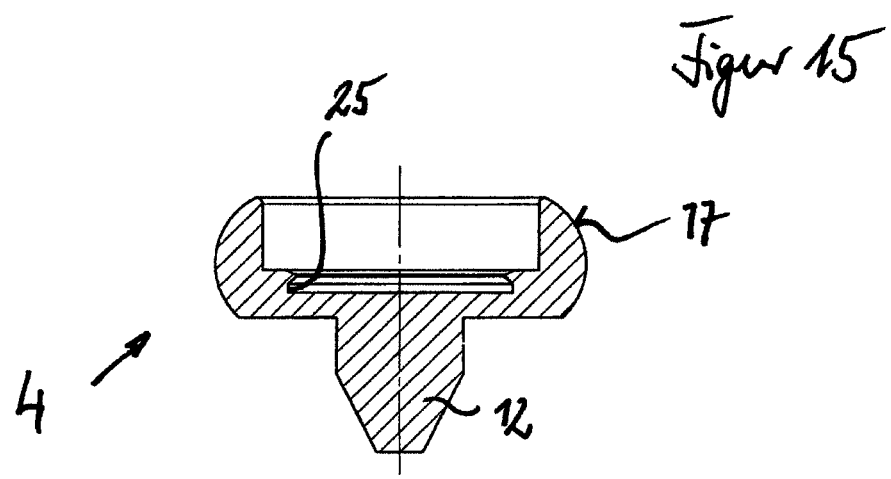
Figur 15

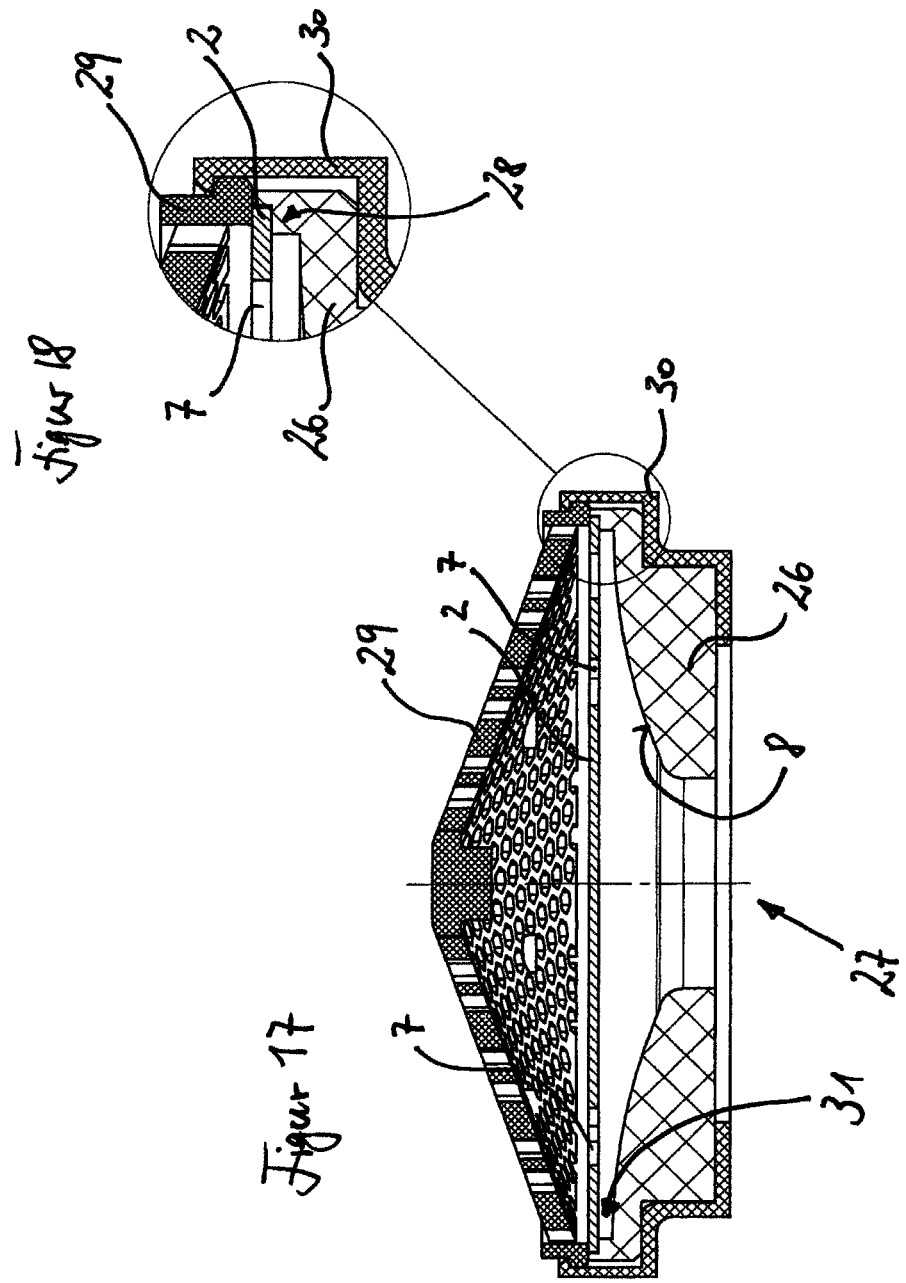

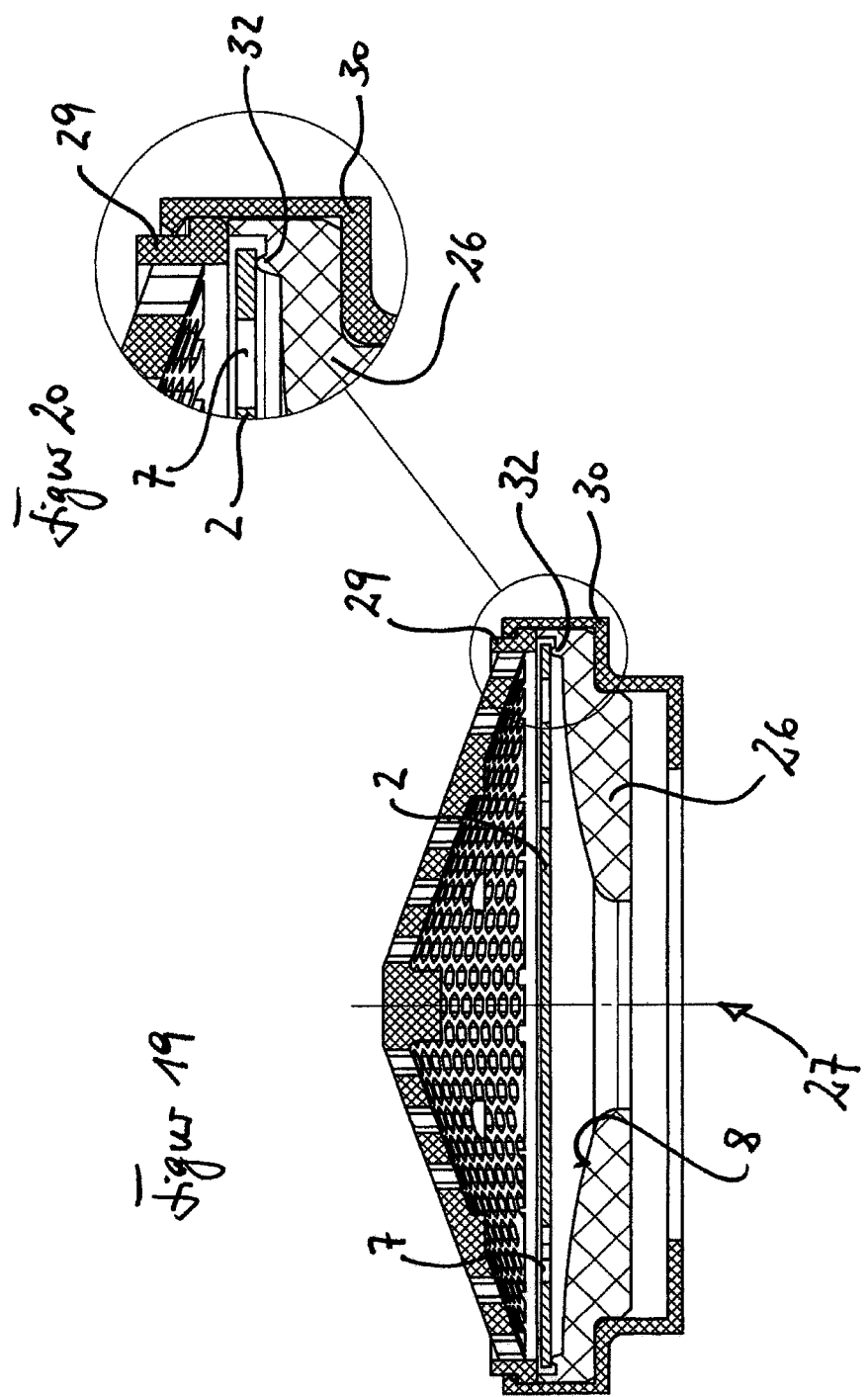

10,663,981 B2

FLOW CONTROL VALVE

BACKGROUND

The invention relates to a flow regulator.

Flow regulators are well known from the prior art in a wide range of fields. They are used or joined end to end in gas or, in particular, liquid conduits and are used to maintain the volumetric flow of a fluid flowing through the flow regulator constant independently of the pressure of the fluid.

DE 2004 008 281 U1 discloses a flow regulator, which includes a housing and a control body guided in the housing. The control body is of conical construction and cooperates with a control opening, into which the control body extends with increasing pressure of the flowing fluid. The control opening is thereby progressively closed. With decreasing pressure, the control body moves back in the direction of its starting position and thus uncovers a greater area of the control opening.

The known flow regulator has proved to be satisfactory. It has, however, been found that the structural height of the known flow regulator is quite high and in this respect is not suitable for all applications. Starting from the known prior art, it is the object of the invention to provide a flow regulator whose structural height is as small as possible.

BRIEF SUMMARY

In order to solve this object, the flow regulator in accordance with the invention has a membrane with at least one opening for the flow of a fluid and annular body with a flow contact surface and at least one flow opening, wherein the flow opening is in flow connection with the at least one opening in the membrane and wherein the membrane is constructed to be bendable in the direction towards the flow contact surface.

The membrane represents an abandonment of the known conical control body. It is of flat construction and has only a small structural height. The fluid can flow through the membrane through the at least one opening.

The membrane cooperates with the flow contact surface of the annular body. When the fluid pressure rises, the membrane bends advantageously in the direction towards the flow contact surface. The at least one opening thus approaches the flow contact surface so far that the opening cross-sectional area for the fluid is reduced.

As a result, the invention provides a flow regulator, which, on the one hand, is in the position to maintain the flow rate constant with changing pressure and which simultaneously has a very low structural height determined by its construction.

The membrane and the flow contact surface preferably define a gap. The fluid flows through the gap at low fluid pressure. As the fluid pressure rises, the gap advantageously becomes increasingly narrower. In this connection, it is to be born in mind that, depending on the material of the membrane, the gap is possibly not fully closed. However, the gap becomes so small, at least in sections, that it inhibits the flow of the fluid.

In an important embodiment of the invention, it is proposed that the gap broadens, preferably continuously, towards the centre of the flow regulator. For a flow regulator with a cylindrical basic shape, as is considered to be particularly advantageous, this means that the gap opens in the direction of the axis of symmetry. In this connection, reference is made to the fact that a flow regulator with a cylindrical basic shape can advantageously have a cylindrical, optionally stepped, outer contour. The inner region of the flow regulator, on the other hand, optionally does not have a rotationally symmetrical construction. Such factors are to be conceptually included by the cylindrical basic shape.

A particularly advantageous embodiment of the invention is characterised in that the membrane is of flat construction in its unloaded state. Such an embodiment has a number of advantages. On the one hand, a flat membrane may be manufactured simply and economically, for instance by stamping or laser cutting. The at least one opening can also be introduced into the membrane by stamping or laser cutting. A further advantage of a flat construction of the membrane resides in the saving of space. Whilst, as mentioned above, conical control bodies are used in the prior art, the advantageous construction of the flow regulator in accordance with the invention is extremely flat.

The membrane preferably has a height of between 0.1 and 0.5 mm, preferably between 0.1 and 0.3 mm. Such a thickness provides, on the one hand, adequate stability of the membrane and, on the other hand, provides the necessary flexibility in order that the membrane bends when the fluid pressure rises.

Known flow regulators are formed, at least partially, of plastic material and have proved to be satisfactory insofar as their manufacture is economical and their service life high. However, it has been found that flow regulators of plastic material are disadvantageous in certain applications. In particular, there are increased hygiene requirements in the hospital and nursing field. All equipment should preferably have as few germs as possible. The desired freedom from germs is not guaranteed with plastic components since plastic materials are susceptible to bacterial infestation caused by the material.

Against this background, it is considered to be particularly advantageous if the membrane is formed of metal and consists, in particular, of stainless steel. Such an advantageous embodiment opens completely new possibilities for use. For instance, the preferred embodiment is advantageously useable in the hospital field. The metallic membrane is treatable, for instance, with aggressive cleaning agents. It is furthermore substantially temperature resistant (particularly, by comparison with plastic), which makes them autoclavable and thus sterilisable. Finally, it is useable in a large temperature range, which opens up new possibilities for use for the flow regulator over and above the hospital field.

The at least one opening in the membrane is associated with a special significance. In the most simple case, it is round (for instance in the form of a stamped hole). It is closed with increasing bending of the membrane.

It is considered to be advantageous if the at least one opening is of elongate construction. An elongate opening offers the possibility that with increasing bending of the membrane the opening is gradually closed over its length. In this connection "closed" means not necessarily a complete closure of the opening. Instead, a closing in which the fluid flow through the opening(s) is reduced as a result of the bending and the approach caused thereby to the flow contact surface is also encompassed.

The preferred, gradual closing of the opening described above comes in useful particularly advantageously when the at least one opening extends inwardly from the exterior. Thus it can e.g. be provided that the opening extends radially from the peripheral region of the membrane to its centre. Alternatively, an arrangement of the opening is possible in which the elongate opening also extends inwardly but (with a hypothetical extension of the opening) passes by the centre of the membrane.

In an important development of the invention it is proposed that the at least one opening is of curved, particularly crescent-shaped, construction. The opening preferably terminates in an arcuate shape in the edge region of the membrane coarsely matched to the edge region of the membrane. Such an embodiment comes into its own particularly advantageously if, as is basically considered to be preferable, the membrane is of round construction in plan view. A curved and preferably crescent-shaped construction provides the possibility of a continuous and simultaneously finely balanced reduction in size of the flow opening with increasing fluid pressure.

An important aspect of the invention resides in that the membrane is bendable in the direction towards the flow contact surface. This results in the at least one opening formed in the membrane being at least partially closed. An embodiment of the invention has proved to be particularly preferable in which, in plan view of the flow regulator, the at least one opening is situated at least partially, preferably substantially, particularly completely above the flow contact surface. This has the result that at a very high pressure the flow regulator is in the position to minimise the flow cross-section of the at least one opening.

The edge region of the membrane is preferably continuous. Such a construction imparts the desired inherent stability to the membrane. At the same time, the at least one opening enables the necessary flexibility, which is required in order that the membrane bends with increasing pressure. The edge region is advantageously not interrupted by the at least one opening.

An advantageous embodiment of the invention is characterised in that the centre of the membrane is continuous. This means that the fluid cannot flow through the membrane in its centre. The centre (and optionally further regions of the membrane) thus serve as a flow contact surface for the fluid in order to deflect the membrane with increasing pressure. Such a construction creates an advantageous response characteristic of the membrane.

In accordance with the invention, the flow regulator has at least one opening. At least three openings are advantageously provided in the membrane, which are preferably uniformly distributed in the membrane. A plurality of openings result in a uniform fluid flow through the flow regulator. In particular, more than 3 openings can also be provided, for instance 4 openings.

The membrane is conveniently fastened to the annular body. For this purpose, the annular body advantageously defines a receptacle for the membrane. Such a construction creates a compact flow regulator.

The receptacle can be constructed in the form of a groove, which is preferably formed circumferentially in the annular body. The membrane is advantageously clippable into this groove, which results in a simple construction of the flow regulator.

Alternatively, the annular body conveniently defines a support for the membrane. The membrane thus rests on the annular body. In this connection, two types of mounting are possible. In a first alternative, the membrane is firmly clamped. In this connection, clamping between the annular body (as support) and, for instance, a fastening ring or a screen body on the inlet side may be considered, which firmly clamps the membrane between itself and the annular body. In the event of bending, the edge regions of the membrane will not bend due to their clamping.

As an alternative to the firm clamping, the membrane is mounted on the annular body in a torque-free manner. In particular, the membrane can rest freely on the support. In the context of the invention, a torque-free mounting is to be understood as the membrane not being clamped at its edge. In the event of bending, the edge regions of the membrane can move so that a relatively more sensitive response characteristic is expected.

It is proposed in an embodiment of the invention that the at least one flow opening is arranged in a central section of the annular body. It is proposed, in particular, that the at least one opening is preferably not arranged in the inner peripheral region of the annular body. It is expected that guiding the fluid through the central section of the annular body will result in particularly advantageous flow conditions, as will be explained in more detail below. In the context of the invention, a central section is to be understood as the middle region of the annular body. There can be one central bore or opening. Also possible are a plurality of flow openings, which are formed centrally in the annular body. For instance, one central opening can be provided, arranged around which in a circular shape is a plurality of further openings, for instance at least 5 openings.

The flow contact surface is preferably inclined downwardly towards the central region. The fluid passing through the openings in the membrane is thus deflected inwardly and flows there through the flow opening in the annular body.

The geometry of the flow contact surface is associated with a particular importance. It determines, amongst other things, the characteristics of the flow regulator. In this connection, it is considered to be particularly advantageous if the flow contact surface of the membrane slopes upwardly asymptotically towards the exterior. This feature also results in an advantageous characteristic curve. The slope is preferably constant. Reference is made at this point to the fact that an asymptotic slope is to be understood as a shape with which the flow contact surface progressively approaches the membrane. A gap can remain between the flow contact surface and the membrane in the edge region of the membrane or the flow contact surface. This alters nothing as regards the asymptotic approach.

The membrane is preferably fastened in its edge region to the annular body, as was explained above with reference to the example of a groove formed in the annular body or the support. The membrane thus advantageously experiences a maximum deflection in its centre. The underside of the membrane can conveniently approach the flow contact surface, which, also slopes downwardly towards the centre, which as described above, results in an advantageous reduction in the flow cross-section.

The primary object of a flow regulator resides in providing a constant flow rate independently of pressure. This is achieved by the fact that with increasing pressure of the fluid the flow cross-section for the fluid through the flow regulator is made smaller. In the case of the invention, the membrane approaches a flow contact surface of the annular body, whereby the cross-sectional area of the openings in the membrane is increasingly made smaller. The flow rate can consequentially be maintained constant even at higher pressure.

A flow regulator is frequently associated with a second purpose. Thus it can be desired that the flow discharging from the flow regulator has certain flow characteristics. It can, in particular, be desired that the fluid, for example water, discharges either in the form of a laminar jet or in the form of a jet mixed with air. It is advantageous in this connection if the annular body has a connecting device in a lower section for a deflecting device for the fluid. The connecting device permits in a particularly advantageous manner the connection of a deflecting device to the flow regulator. As a result of the arrangement in the lower section, the compact, flat structure of the flow regulator is enhanced.

The connecting device preferably has a plurality of feet, which are preferably directed radially outwardly. The feet can advantageously engage into a conveniently peripheral groove in the deflecting device. For this purpose, the feet, which are preferably of resilient construction, are simply clipped into the deflecting device and thus create a stable connection. A preferred embodiment of the invention is characterised in that the connecting device defines at least one opening for the flow of the fluid. In the case of the feet, the fluid thus flows, for instance, through gaps formed between the feet.

Alternatively, the connecting device has a preferably central connecting peg. The connecting peg engages in a central peg receptacle in the deflecting device. A plurality of flow openings is preferably formed around the connecting peg. The connection is preferably created by a press fit. Such a connection is particularly simple to implement from the manufacturing point of view and indeed also when the annular body is formed of metal, as is considered to be advantageous.

With a view to a compact and flat structure of the valve in accordance with the invention, a preferred embodiment is provided, in which the annular body has an underside opposite to the flow contact surface, which induces an outward flow of the fluid. The annular body thus has not only an upper surface, which serves as the flow contact surface, but also an underside, which permits guiding of the fluid outwardly. In addition to compact dimensions, such a construction also creates a particularly advantageous flow of the fluid.

An embodiment, in which the underside has a circular cavity has proved to be particularly simple from the manufacturing point of view. The cavity serves to produce the deflection of the fluid described above.

A flow regulator is also claimed within the scope of the invention which has a deflecting device, which is connected to the annular body.

BRIEF DESCRIPTION OF THE DRAWINGS

The invention will be explained in more detail by way of preferred exemplary embodiments in conjunction with the attached drawings, in which:

FIG. 1 is a schematic, exploded view of a first exemplary embodiment of the flow regulator in accordance with the invention;

FIG. 2 is a schematic sectional view of the first exemplary embodiment;

FIG. 3 is a schematic, exploded view of a second exemplary embodiment of the flow regulator in accordance with the invention;

FIG. 4 is a schematic view sectional view of the second exemplary embodiment;

FIG. 5 is a schematic, exploded view of a third exemplary embodiment of the flow regulator in accordance with the invention;

FIG. 6 is schematic sectional view of the third exemplary embodiment;

FIG. 7 is a schematic side view of a membrane in accordance with the invention, as is used in the three exemplary embodiments;

FIG. 8 is a schematic plan view of the membrane of FIG. 7;

FIG. 11 is a schematic sectional view of an annular body in accordance with the invention, as is used in the second exemplary embodiment;

FIG. 12 is a schematic plan view of the annular body of FIG. 11;

FIG. 13 is a schematic sectional view of an annular body in accordance with the invention, as is used in the third exemplary embodiment;

FIG. 14 is a schematic plan view of the annular body of FIG. 13;

FIG. 15 is a schematic sectional view of a deflecting device in accordance with the invention, as is used in the first and second exemplary embodiments;

FIG. 16 is a schematic sectional view of a deflecting device in accordance with the invention, as is used in the third exemplary embodiment;

FIG. 17 is a schematic sectional view of a fourth exemplary embodiment of the flow regulator in accordance with the invention;

FIG. 18 is a detailed view of the fourth exemplary embodiment of FIG. 17;

FIG. 19 is a schematic sectional view of a fifth exemplary embodiment of the flow regulator in accordance with the invention; and FIG. 20 is a detailed view of the fifth exemplary embodiment of FIG. 19.

DETAILED DESCRIPTION

Figure 9:
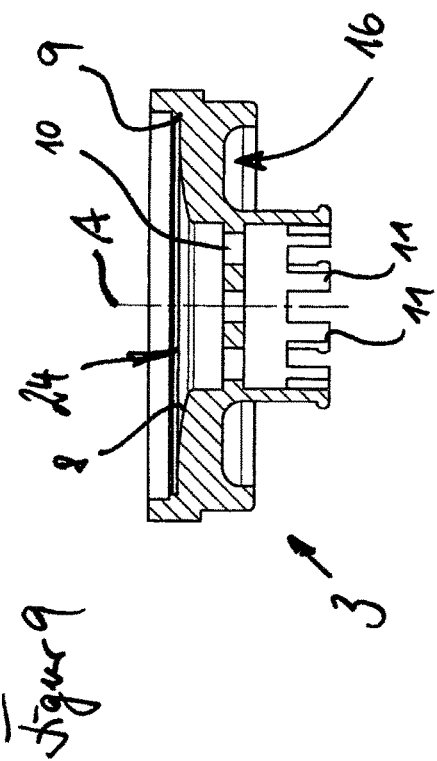
FIG. 9 is a schematic sectional view of an annular body in accordance with the invention, as is used in the first exemplary embodiment.

FIG. 1 shows an exploded view of a first exemplary embodiment of the flow regulator in accordance with the invention. Going from top to bottom, the flow regulator includes the following components:

A first screen 1, a membrane 2, an annular body 3, a deflecting device 4, a second screen 5, and a housing wall 6. The membrane 2 and the annular body 3 are obligatory in the context of the invention. They constitute the flow regulator. The two screens 1 and 5, the deflecting device 4 and the housing wall 6 are considered to be advantageous embodiments of the invention. The last mentioned components add to the flow regulator in accordance with the invention the further function of a jet regulator.

At this point, the basic function of the flow regulator in accordance with the invention should be at least foreshadowed in conjunction with FIG. 1. The first screen 1 is a dirt screen. It serves to retain dirt particles within the fluid.

The membrane 2 includes a plurality of openings 7, through which the fluid flows. The membrane is of flexible construction.

The annular body 3 has a flow contact surface 8, which preferably runs around within the annular body 3 and advantageously defines a passage (see FIGS. 9, 11 and 13). In the installed state (see FIG. 2), the membrane 2 is bendable in the direction towards the flow contact surface 8. The annular body 3 further includes a circumferential groove 9, into which the membrane 2 (and optionally the screen 1), is or are insertable.

The annular body 3 further includes a plurality of flow openings 10, through which the fluid can flow. Formed on the underside of the annular body 3 is a plurality of feet 11, which serve to fasten the deflecting device 4, as will be explained in more detail below in conjunction with FIG. 2.

The deflecting device 4 is of mushroom-like construction and, at its lower end, includes a peg 12, which, on the one hand, has a flow guiding function for the fluid and, on the other hand, holds the screen 5 at a distance.

The screen 5 preferably has a relatively coarse mesh size and acts as a flow straightener. The fluid flowing through the screen 5 is homogenised by the screen 5. The screen 5 preferably has larger mesh size than the screen 1.

The housing wall 6 holds the screen 5 in position and defines together with the deflecting device 4 a flow path, as will be described in more detail below.

Reference is made to FIG. 2, which is a sectional view of the first exemplary embodiment in the assembled state. Screen 1 and the membrane 2 are clipped into the annular body 3, whereby the screen is located in the annular body 3 in a prestressed state. The membrane 2 is preferably aligned flat in its unloaded state. The membrane 2 and the annular body 3 define between them a gap 13, which is advantageously produced by the fact that the flow contact surface 8 is inclined downwardly towards the interior of the flow regulator.

The fluid flows into the flow regulator from above, in the drawing, through the screen 1 and through the openings 7. When the pressure of the fluid is low, the openings 7 are preferably fully open. If the fluid pressure increases, the membrane 2 bends downwardly in the direction towards the flow contact surface 8. The open cross-sectional area of the opening 7 is thus reduced. The consequence is a substantially constant volumetric flow of the fluid in spite of the increased fluid pressure. It will be understood that in the event of pressure fluctuations of the fluid small volumetric flow fluctuations can occur.

The fluid thus flows through the openings 7 and the subsequent flow openings 10 in the annular body 3. Formed between the feet 11 of the annular body is a respective gap 14, through which the fluid can flow outwardly out of the annular body. The annular body 3 and the deflecting device 4 connected to the annular body advantageously define between them a first annular space 15. The fluid flows from there into a cavity 16 formed on the underside of the annular body. The cavity 16 is advantageously circular.

The deflecting device 4 has a mushroom head-shaped outer surface 17. This defines together with the housing wall 6 a second annular space 18. The fluid flows downwardly from the latter out of the flow regulator.

It should be mentioned at this point that in the context of the invention terms such as "upwardly" and "downwardly" are used. Even though the flow regulator in accordance with the invention can be installed in any desired orientation, these indications relate to an upright flow regulator, as is illustrated, for instance, in FIG. 2. Furthermore, the terms "inwardly", "outwardly" and "centre" are used in the context of the invention. These indications relate to the component in question. Thus the middle or the centre of the annular body 3, for instance, is to be understood as that region which is defined by the axis extending centrally downwardly from above in FIG. 2 through the flow regulator. In the deflecting device there is, for instance, one axis of symmetry. The centre is not fixed on the axis or a point on the axis. The region extending around it is instead also included.

FIGS. 3 and 4 show a flow regulator which, in distinction to the first exemplary embodiment, instead of a plurality of flow openings 10 (see e.g. FIGS. 1 and 2), has merely one central flow opening 19. This can have advantages from the fluid mechanics point of view. The illustrated second exemplary embodiment is otherwise of the same construction as the first. This applies also to the fastening of the housing wall 6 on the annular body 3, which is preferably produced by a press fit. Screen 5 is, as also in the first exemplary embodiment, clipped into the housing wall 6 and is held at a distance by the peg 12.

FIGS. 5 and 6 show a third exemplary embodiment of the flow regulator in accordance with the invention, which differs from the first two exemplary embodiments, amongst other things, in the fastening of the deflecting device on the annular body.

The annular body 20 has a central connecting peg 21. Formed around the connecting peg 21 is advantageously a plurality of flow openings 10. The deflecting device 22 has a central peg receptacle 23. In order to connect the deflecting device 22 to the annular body 20, the connecting peg 21 is inserted into the peg receptacle 23, preferably as a press fit. Such a connection has the advantage of a simple manufacture of the annular body 20, even if the annular body consists of metal, particularly stainless steel, as is considered to be preferable.

FIG. 7 is a side view of the membrane 2 on its own. It is flat and (in the unloaded state) of planar construction. The membrane can, in particular, be of one-piece construction.

FIG. 8 is a plan view of the membrane 2. An advantageous arrangement of the opening 7 will be clear from this view. The openings 7 preferably have a elongate shape. As the membrane 2 is deflected, the flow area of the openings is progressively closed. It is considered to be preferred if the opening 7 are of crescent shape. The openings 7 can, in particular, extend inwardly from the exterior. The membrane 2 is advantageously circular. As may well be seen, the edge region R is advantageously of continuous construction. The same applies to the centre M of the membrane 2.

FIG. 9 shows the annular body 3 of the first exemplary embodiment in a sectional view. It is clear from this that the flow contact surface 8 is inclined downwardly towards the centre which is indicated by the axis A. The flow contact surface 8 is preferably circular and defines within it a central opening 24. Also readily visible is the cavity 16 on the side of the annular body remote from the flow contact surface, which is preferably circular. The membrane 2 (not shown here) is incidentally insertable into the groove 9.

Figure 10:
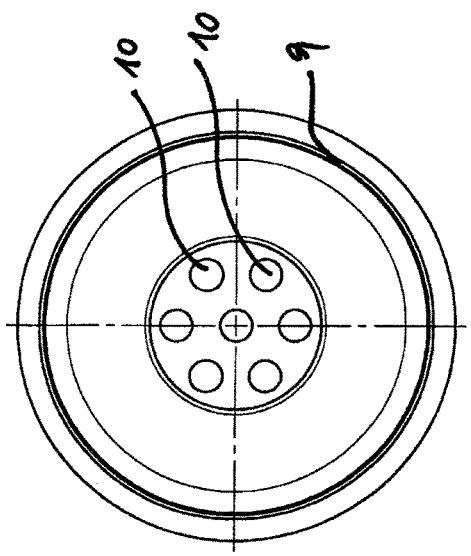
FIG. 10 is a schematic view plan view of the annular body of FIG. 9.

FIG. 10 is a plan view of the annular body 3. It has seven flow openings 10. More or fewer flow openings are possible.

FIG. 11 shows the annular body 3 of the second exemplary embodiment in a sectional view, which differs from the first exemplary embodiment shown in FIGS. 9 and 10 in that instead of a plurality of flow openings, merely a single central flow opening 19 is provided. In other respects, reference is made to the preceding description.

FIG. 12 shows the annular body 3 of the second exemplary embodiment in plan view. The flow contact surface 8 advantageously surrounds the passage 24. The flow opening 19 is arranged centrally. It is within the scope of the inventive concept to combine the passage 24 and the flow opening 19 into one flow opening, which then has no step but passes through cylindrically.

FIGS. 13 and 14 show the annular body 20 of the third exemplary embodiment, which includes a connecting peg 21 on its underside. The openings 10 are arranged around the connecting peg.

FIG. 15 shows the deflecting device 4 of the first two exemplary embodiments. The deflecting device advantageously includes a receptacle 25, constructing the form of a groove, for connection to the annular body 3. The outer surface 17 of the deflecting device is of mushroom-shaped construction.

FIG. 16 is a sectional view of the deflecting device 22. The peg receptacle 23 is suitable for receiving the peg 21 (FIG. 13).

Reference is made to FIGS. 17 and 18, which show a fourth exemplary embodiment in accordance with the invention. The annular body is marked with the reference numeral 26. The annular body has a central flow opening 27.

The annular body 26 constitutes a support for the membrane 2. For this purpose, it includes a step 28, on which the membrane 2 rests. The membrane 2 is firmly clamped against the annular body 26 by a screen body 29. For this purpose, a clamping body 30 engages above the screen body 29 and at the same time engages below the annular body 26 and thus holds the two components together. As will be clear, in particular, from FIG. 18, a spacing 31 can be formed between the membrane 2 and the flow contact surface 18. As may be seen particularly well in FIG. 17, the flow contact surface 8 approaches the membrane 2 asymptotically. The latter is planar in its unloaded state.

Reference is made to FIGS. 19 and 20, which show a fifth exemplary embodiment. For reasons of clarity, the same reference numerals are used for the same (functional) components, even if the components differ slightly structurally.

The difference between the fourth and fifth exemplary embodiments resides in the construction of the support of the annular body 26 and thus in the mounting of the membrane 2. Whilst the membrane is firmly clamped in the fourth exemplary embodiment, the membrane rests in the exemplary embodiment illustrated in FIGS. 19 and 20 on a bead-like projection 32. In contrast to the fourth exemplary embodiment, the screen body 29 furthermore does not press the membrane against the annular body 26 so that the membrane is mounted in a torque-free manner. On deflection of the membrane, the edges of the membrane are thus in the position to adapt their inclination to the deflection. The clamping body 30 presses the screen body 29 against the annular body 26.

In the preceding description of the Figures reference numerals are used in part for components which differ slightly. This is intended to be conducive to better clarity. Furthermore, the views of the individual components and assemblies are not always true to scale. This is also intended to improve clarity.

LIST OF REFERENCE NUMERALS

1. Screen
2. Membrane
3. Annular body
4. Deflection device
5. Screen
6. Housing wall
7. Openings
8. Flow contact surface
9. Groove
10. Flow openings
11. Feet
12. Peg
13. Gap
14. Gap
15. Annular space
16. Cavity
17. Outer surface
18. Annular space
19. Flow opening
20. Annular body
21. Peg
22. Deflection device
23. Peg receptacle
24. Opening
25. Receptacle
26. Annular body
27. Flow opening
28. Step
29. Screen body
30. Clamping body
31. Spacing
32. Projection
R Edge
M Centre

The invention claimed is:

1. A flow regulator including:
   a membrane, which has at least one opening for the flow of a fluid, wherein the at least one opening has a length and a width and extends radially inwardly along its length from a first end located near a periphery of the membrane to a second end located further from the periphery of the membrane, and wherein the length of the at least one opening is larger than its width,
   an annular body, which has a flow contact surface and at least one flow opening,
   wherein the at least one flow opening is in flow connection with the at least one opening in the membrane,
   wherein the membrane is constructed to be bendable in a direction towards the flow contact surface, and
   wherein the membrane in an unloaded state has planar top and bottom surfaces across the entire extent of the membrane.

2. A flow regulator as claimed in claim 1, wherein the membrane and the flow contact surface define a gap.

3. A flow regulator as claimed in claim 2, wherein the gap broadens towards the centre of the flow regulator.

4. A flow regulator as claimed in claim 1, wherein the membrane has a height of between 0.1 and 0.5 mm.

5. A flow regulator as claimed in claim 4, wherein the membrane has a height of between 0.1 and 0.3 mm.

6. A flow regulator as claimed in claim 1, wherein the membrane is made of a metal.

7. A flow regulator as claimed in claim 1, wherein the at least one opening in the membrane is of elongate construction.

8. A flow regulator as claimed in claim 1, wherein the at least one opening in the membrane is curved.

9. A flow regulator as claimed in claim 1, wherein the at least one opening in the membrane is situated at least partially above the flow contact surface.

10. A flow regulator as claimed in claim 9, wherein the at least one opening in the membrane is situated completely above the flow contact surface.

11. A flow regulator as claimed in claim 1, wherein an edge region of the membrane is continuous in a peripheral direction.

12. A flow regulator as claimed in claim 1, wherein a centre of the membrane is continuous in a direction radially inwardly from the at least one opening in the membrane.

13. A flow regulator as claimed in claim 1, further comprising at least 3 openings in the membrane, which are distributed generally uniformly in the membrane.

14. A flow regulator as claimed in claim 1, wherein the annular body defines a receptacle for the membrane.

15. A flow regulator as claimed in claim 14, wherein the receptacle comprises a groove, into which the membrane is fixed.

16. A flow regulator as claimed in claim 1, wherein the annular body defines a support for the membrane.

17. A flow regulator as claimed in claim 16, wherein the membrane is mounted in a torque-free manner on the annular body and rests freely on the support.

18. A flow regulator as claimed in claim 1, wherein the at least one flow opening is arranged centrally in the annular body.

19. A flow regulator as claimed in claim 1, wherein the flow contact surface is inclined downwardly towards the centre of the annular body.

20. A flow regulator as claimed in claim 1, wherein the annular body includes a connecting device for a deflecting device for the fluid in a lower section of the annular body.

21. A flow regulator as claimed in claim 20, wherein the connecting device includes a plurality of feet, which are directed radially outwards.

22. A flow regulator as claimed in claim 20, wherein the connecting device defines at least one opening for the flow of the fluid.

23. A flow regulator as claimed in claim 22, wherein the connecting device includes a central connecting peg.

24. A flow regulator as claimed in claim 1, wherein the annular body has an underside, opposite to the flow contact surface, wherein the underside induces an outward flow of the fluid.

25. A flow regulator as claimed in claim 24, wherein the underside of the annular body comprises a circular cavity.

26. A flow regulator as claimed in claim 1, further comprising a deflecting device for the fluid, wherein the deflecting device is connected to the annular body.

27. A flow regulator as claimed in claim 1, wherein the at least one flow opening is arranged radially inwardly from an outer peripheral region of the annular body.

28. A flow regulator as claimed in claim 1, wherein the at least one opening in the membrane is crescent-shaped.

29. A flow regulator as claimed in claim 1 wherein the membrane outside the at least one opening in the membrane has a thickness which is constant across its width.

30. A flow regulator including;
- a membrane, which has at least one opening for the flow of a fluid,
- an annular body, which has a flow contact surface and at least one flow opening,
- wherein the at least one flow opening is in flow connection with the at least one opening in the membrane, and
- wherein the membrane is planar and is constructed to be bendable in a direction towards the flow contact surface;
- wherein the flow contact surface rises asymptotically towards a plane in which the membrane lies; and
- wherein the membrane and the flow contact surface define a gap which becomes increasingly narrower as a pressure of the fluid rises.

* * * * *